US00RE34853E

United States Patent [19]

DeAngelis et al.

[11] E Patent Number: Re. 34,853

[45] Reissued Date of Patent: Feb. 7, 1995

[54] PREPARATION OF MONOLITHIC CATALYST SUPPORTS HAVING AN INTEGRATED HIGH SURFACE AREA PHASE

[75] Inventors: Thomas P. DeAngelis, East Amherst; Irwin M. Lachman, Corning, both of N.Y.

[73] Assignee: Corning Incorporated, Corning, N.Y.

[21] Appl. No.: 594,076

[22] Filed: Oct. 9, 1990

Related U.S. Patent Documents

Reissue of:

[64] Patent No.: 4,637,995
Issued: Jan. 20, 1987
Appl. No.: 712,885
Filed: Mar. 18, 1985

[51] Int. Cl.[6] ..... B01J 20/28; B01J 35/00

[52] U.S. Cl. ..... 502/439; 502/64; 502/263; 502/351; 502/355; 502/524; 502/527

[58] Field of Search ..... 502/527, 439, 64, 263, 502/351, 355, 524

[56] References Cited

U.S. PATENT DOCUMENTS

| | | | |
|---|---|---|---|
| 2,742,437 | 4/1956 | Houdry | 252/455 |
| 3,824,196 | 7/1974 | Benbow et al. | 252/455 R |
| 3,972,834 | 8/1976 | Washbourne | 502/527 X |
| 4,007,134 | 2/1977 | Liepa et al. | 252/455 Z |
| 4,151,121 | 4/1979 | Gladrow | 252/455 |
| 4,157,375 | 6/1979 | Brown et al. | 423/212 |
| 4,239,656 | 12/1980 | Fujitani et al. | 252/463 |
| 4,253,992 | 3/1981 | Soejima et al. | 502/527 X |
| 4,277,376 | 7/1981 | Paolasini | 252/455 R |
| 4,294,806 | 10/1981 | Abe et al. | 423/210 |
| 4,337,028 | 6/1982 | Angwin et al. | 252/462 |

FOREIGN PATENT DOCUMENTS

| | | |
|---|---|---|
| 1442653 | 8/1969 | Germany . |
| 111843 | 8/1980 | Japan . |
| 1064018 | 4/1967 | United Kingdom . |
| 1142800 | 2/1969 | United Kingdom . |
| 1315553 | 3/1973 | United Kingdom . |

*Primary Examiner*—Carl F. Dees
*Attorney, Agent, or Firm*—Kees van der Sterre

[57] ABSTRACT

A method of preparing a monolithic catalyst support having an integrated high surface area phase is provided. A plasticized batch of ceramic matrix material intimately mixed with high surface area powder is formed into the desired shape for the monolith and then heated to sinter the ceramic. The resulting monolith has a strong substrate of the ceramic matrix material and a high surface area phase provided by the high surface area powder extruded with the batch.

25 Claims, No Drawings

PREPARATION OF MONOLITHIC CATALYST SUPPORTS HAVING AN INTEGRATED HIGH SURFACE AREA PHASE

Matter enclosed in heavy brackets [ ] appears in the original patent but forms no part of this reissue specification; matter printed in italics indicates the additions made by reissue.

BACKGROUND OF THE INVENTION

This invention is directed to monolithic ceramic catalyst supports and particularly to supports which contain a high surface area phase incorporated within the ceramic matrix itself.

It conventional ceramic monlithic catalyst consists of a ceramic support with a coating of high surface material upon which the catalyst is actually deposited. In particular, the ceramic support is normally prepared by sintering a mold of clay or other ceramic material at a high temperature to impart density and strength. This procedure normally results in a very small surface area, and consequently the ceramic must be coated with an other material having a higher surface area, as well as specific chemical characteristics on which to actually deposit the catalyst. This procedure of depositing a high surface area "wash coat" on the low surface area ceramic wall is disclosed, for example, in U.S. Pat. Nos. 2,742,437 and 3,824,196.

Catalyst supports of this kind suffer from several disadvantages. In service, the supports are exposed to a flow of gases which often contain dusts or particulate matter, which can cause the high surface area coating to flake off the underlying ceramic support. This phenomenon can also occur where the support is exposed to thermal cycling becuase the wash coat and the underlying ceramic material often have different thermal expansion coefficients. Furthermore, catalysts deposited on the high surface area wash coat are susceptible to poisoning, such as by lead or phosphorous in service in automobile converters, and therefore must be periodically regenerated or replaced.

U.S. Pat. No. 4,294,806 discloses the preparation of monolithic supports by extrusion of an alumina ceramic material into the shape of a honeycomb, calcining the material, and then sintering only the front portion. This procedure is said to make the support more abrasion resistant. However, the bulk of the support remains unsintered, so that even thourgh it retains high surface area, the support would lack high strength. U.S. Pat. No. 4,151,121 discloses the preparation of a catalyst by dispersing zeolite and a high surface area alumina (on which a catalytic metal is supported) in a hydrogel of a porous oxide matrix material (such as alumina, clay, silica-alumina composites, and the like) to form a composite mixture. The composite is spray dried, washed free of salts, and then flash dried. Ths method produces catalyst materials in which the high surface material is embedded within a matrix, and thereby somewhat protected from abrasion or poisoning. However, the method is not suitable for the preparation of catalyst support structures that are in monolithic form, the kind normally used in the services where these problems are most prevalent or most severe. British Pat. No. 1,064,018 discloses tubular catalyst supports prepared by forming a paste of alpha-alumina, active alumina, and hydrargillite (a high surface area alumina trihydrate), extruding the paste to form tubular elements, and firing the elements.

It is an object of the present invention to provide a monolithic support having a high surface area which is not easily abraded and which supports catalysts in a manner that resists poisoning. It is a further object of the invention to provide a monolithic support which has good mechanical properties while retaining the porosity and high surface area necessary for proper catalytic functioning These and other objects are met by the invention to be described.

SUMMARY OF THE INVENTION

The present invention provides a method of preparing a monolithic ceramic support for a catalyst, which support has a high surface area phase intimately mixed with, and incorporated into, the ceramic material itself. The method comprises providing a substantially homogenous body comprising an admixture of (i) a ceramic matrix material, in particulate from finer than 200 mesh, selected from cordierite, mullite, alpha-alumina, lithium aluminosilicate, and mixtures of these, and (ii) a high surface area support material having a crystallite size no larger than 0.2 microns and a surface area of at least 40 $m^2/g$. The support material may comprise [a catalyst-support oxide (e.g. alumina, zirconia, silica, spinel, titania, zeolite), a transition metal sulfide, or mixtures of these.] *transition metal sulfide; a mixture of transition metal sulfides; porous oxide selected from the group consisting of zirconia, spinel, silica, zeolite, titania, mixtures of these and mixtures of the preceeding with alumina; or a mxiture of said sulfide and said oxide materials.*

The mixed body is formed into a desired shape and then heated to sinter the ceramic matrix material.

The monolithic support prepared in this manner comprises a ceramic matrix, as a first phase, sintered to a desirable level of strength, and a second high surface area phase well dispersed within the ceramic matrix on which to actually support catalyst. It has been recognized that ceramic, although sintered, is itself porous and that the high surface area material, even though within the walls of the ceramic, is accessible to the target gas stream and provides suitable surface area and extended catalyst life. The embedded high surface area material, upon which catalytically active materials are deposited, is protected from abrasion, and it is thought that the ceramic acts as a filter, by reaction or adsorption, to eliminate poisons before they can contact and adversely affect the catalyst itself. Another advantage of the monolithic supports of this invention, compared to those heretofore used, is the lower weight attributable to replacement of the denser ceramic material with the lighter high surface area phase and the elimination of the conventional washcoat. In those applications requiring the catalyst to be thermally activated and to function quiclky, such as in automotive catalyic convertors, the reduced thermal mass in the present monolith permits the "light off" temperature to be reached quickly.

DETAILED DESCRIPTION OF THE INVENTION

In the method of the present invention, a sinterable, ceramic matrix material and a high surface area material are combined into a single plasticized batch which is formed into a desired shape for the monolithic support. In this manner, the high surface area phase is incorporated into the monolith itself, eliminating the heretofore required step of coating a pre-formed sintered ceramic, which itself normally has low porosity and surface area, with an additional high surface area substance on which catalyst is actually supported. Accordingly, the present invention provides a monolithic support having strength, due to the sintered ceramic phase, and available surface area, due to the embedded high surface area materials.

The high surface area materials suitable for use in the present invention are porous oxides and transition metal sulfides, generally in fine powder form, havig a crystallite size of 0.2 microns or smaller and a surface area of at least 40 square meters per gram of weight ($m^2/g$), preferably at least 100 $m^2/g$, and most preferably at least 200 $m^2g$. This surface area may be present in the material naturally or may manifest itself after calcining. The practice of this invention contemplates either case. (As used herein, "Calcining" means heating a material to a temperature below that at which the material begins to shrink or sinter.) With respect to the oxides, they are preferably [alumina] silica, a spinel, titania, zircomia, or a zeolite. Mixtures of the oxides can also be used. The invention is not limited to these particular oxides, however, and as those skilled in the art will recognize, the invention contemplates the use of other materials which are commonly used as catalyst supports and which have the above-described characteristics.

The aluminas useful[as] *in* the high surface are a material of this invention are those which, before or upon calcining, provide gamma-alumina or other transition aluminas having the specified crystallite size and surface area. Colloidal gamma-alumina can be used directly, or "alumina-precursors" such as alpha-alumina monohydrate, or aluminum chlorohydrate can also be used. When alpha-alumina monohydrate isused, the particle size can be from less than 1 micron up to about 100 microns. Suitable commercially available materials of this kind are Kaiser SA substrate alumina, available from the Kaiser Chemical Division of Kaiser Aluminum Corporation, and the Catapal® aluminas available from the chemical division of Conoco Corporation. The colloidal gamma-alumina is preferably in the form of particles not exceeding 1 micron. The aluminum chlorohydrate is generally in the form of an aqueous solution of aluminum chloride, preferably with an alumina content of at least 20% by weight. Suitable products of this kind are the Chlorohydrol®, Rehydrol®, and Rehabond® alumina products available from Reheis Chemical Company.

Spinels useful in the present invention are the magnesium aluminate spinels heretofore used as catalyst supports, including spinel solid solutions in which magnesium is partially replaced by such other metals as manganese, cobalt, zirconium, or zinc. Preferred spinels are magnesium aluminate spinels having 1–7 percent by weight alumina in excess of 1:1 $MgO.Al_2O_3$ spinel; that is, those having about 72.0–73.5 weight percent $Al_2O_3$ (balance MgO). Spinels of this kind are available on order from Baikowski International Corporation of Charlotte, N.C., or can be prepared by co-precipitation or wet-mixing precursor powders of alumina and magnesia, followed by drying and calcining. Such a procedure is described in U.S. Pat. No. 4,239,656, the disclosure of which is hereby incorporated by Reference. As a supplement to this disclosure, however, it has been found that calcining of the spinels should normally not exceed 1300° C. for 2–2.5 hours. Calcining temperatures below 1200° C. are preferred. Suitable alumina precursor powders for preparation of the spinels are commercially available as Kaiser SA hydrated alumina or Conoco CATAPAL SB alumina (boehmite alpha-alumina monohydrate). Magnesium oxide component powders found to be suitable are magnesium hydroxide slurry, about 40 weight percent MgO, available from Dow Chemical Company, or hydrated magnesium carbonate.

High surface area silicas useful as the high surface area phase are the amorphous silicas of about 1–10 microns or sub-micron particle size such as CABOSIL EH-5 colloidal silica, available from Cabot Corporation. Silica precursors, such as an aqueous suspension of colloidal silicate, can also be used. High surface area titanias suitable for use are also commercially available, such as P25 $TiO_2$ available from DeGussa Corporation. Titania precursors such as hydrolyzed titanium isopropoxide can also be used.

The use of zeolites to provide high surface area in various catalytic and molecular sieving operations is well known. Readily available zeolites useful in the present invention include the crystalline aluminosilicate zeolites with the art-recognized designations. A, X, and Y, and silicalite. Zeolites A, X, And Y, and their methods of preparation, are disclosed in U.S. Pat. Nos. 2,882,243; 2,882,244; and 3,130,007; respectively. Disclosures of these patents is incorporated by reference. Silicalite is described in NATURE (271), No. 5645 (1978).

Composites of alumina and silica also can form the basis for the high surface area agglomerates. Alumina-silica composites are commercially available from Davison Chemical Division of W. R. Grace Company and from the Norton Company, or can be prepared by the gel processes as described, for example, in U.S. Pat. Nos. 4,129,522 and 4,039,474. Alternatively, alumina and silica or their precursors can be mixed directly during the preparation of the monoliths as described below.

Transition metal sulfides, such as cerium sulfide, nickel sulfide, iron sulfide, titanium sulfide, and chromium sulfide, or mixtures can be combined with cordierite, mullite, alpha-alumina, lithium alumino-silicates or mixtures.

When the high surface area material is an alumina, spinel, or a mixture of alumina and silica, it is preferred to add up to about 20 percent by weight (based on the alumina, spinel, or alumina-silica mixture weight) of a rare earth oxide. The preferred rare earth oxides are those of the "cerium subgroup", that is, elements of atomic number 57–62, particularly cerium and lanthanum. Cerium oxide is most preferred. Paticularly useful spinels, for example, are those in which about 1 to 20 percent by weight, based on the total spinel weight, of cerium oxide is present. Cerium oxide is incorporated by adding, for example, cerium acetate, cerium carbonate, or cerium nitrate to the other precursor powders during the spinel preparation. In like manner, particularly useful mixtures of alumina and silica are those in which about 5 percent by weight, based on the total alumina and silica dry weight, of cerium oxide is present.

The transition metal sulfides preferable for use in the present invention are cerium sulfide, nickel sulfide, iron sulfide, titanium sulfide, and chromium sulfide. Mixtures of these can also be used.

The preferred high surface area materials are silica, the magnesium aluminate spinels, and the transition aluminas.

The ceramic material, which forms the high-strength matrix phase of the monolith, is comprised of any of the well known sinterable materials capable of providing mechanical strength and good thermal properties in monolithic supports as heretofore prepared by those skilled in the art. Preferably the ceramic is selected from cordierite, mullite, alphaalumina, and lithium aluminosilicates. Mixtures of these can also be used to the extent that the chosen materials are compatible and will not degrade each other, as those skilled in the art will recognize. To cordierite can be in the precursor or "raw" form, as in U.S. Pat. No. 3,885,977, which becomes true cordierite upon heating, but it is preferably pre-reacted. The use of raw cordierite is disclosed in the U.S. Pat. No. 3,885,977. When raw cordierite is used, it is preferred that up to 10% by total weight of $B_2O_3$ be added to the raw batch to promote the actual cordierite formation and to impart strength.

The ceramic material can contain substantial amounts of a component which causes intracrystalline and intercrystalline microcracking to occur. Such microcracking enhances the thermal shock resistance of monolithic supports based on these ceramics and is therefore desirable when the monoliths, in service, may be exposed to rapid changes in temperature. Ceramic materials which contain such a component, and are therefore contemplated for use within the present invention are disclosed in U.S. Pat. Nos. 3,528,831; 3,549,400; and 3,578,471; all issued to I. M. Lachman. A preferred microcracking agent for addition to the ceramic material is aluminum titanate, which is normally incorporated into the ceramic matrix as a "solid solution" with the basis ceramic material. An aluminum titanate solid solution with mullite is disclosed in U.S. Pat. No. 4,483,944 to Day, et al. The disclosures of the four above-mentioned patents are incorporated herein by reference.

The monolithic supports are prepared by mixing the sinterable ceramic materials with the high surface area materials described above and, optionally, a binder. Generally about 10–50 parts by weight of the high surface area material will be combined with 50–90 parts by weight of the ceramic material. Preferably, 1–30 parts by weight of binder will also be used. Any binder material conventionally used in ceramic catalyst support manufacture is suitable. Examples are disclosed in:

"Ceramics Processing Before Firing," ed. by George Y. Onoda, Jr. & L. L. Hench, John Wiley & Sons, New York "Study of Several Groups of Organic Binders Under Low-Pressure Extrusion," C. C. Treischel & E. W. Emrich, Jour. Am. Cer. Soc. (29), pp. 129–132, 1946 "Organic (Temporary) Binders for Ceramic Systems," S. Levine, Ceramic Age, (75) No. 1, pp. 39+, January 1960

"Temporary Organic Binders for Ceramic Systems," S. Levine, Ceramic Age, (75) No. 2, pp. 25+, February 1960.

Preferred are methyl cellulose or a silicone resin. The silicone resins preferred for use are Dow Corning Corporation's Q6-2230 silicone resin or those described in U.S. Pat. No. 3,090,691 to Weyer. The most preferred binder is methyl cellulose, available as Methocel® A4M from the Dow Chemical Company. It is preferred to use at least some methyl cellulose in addition to silicone resin as a binder. Up to about 1 percent by weight, based upon total mixture weight, of a surfactant, such as sodium stearate, can also be used to facilitate mixing and flow for subsequent processing. The mixing step should be performed in a liquid, such as water, which acts as a further plasticizer. When the binder is a silicone resin, it is preferred to use isopropyl alcohol in addition to water. Normally, the dry ingredients as first pre-mixed and then combined with the liquid plasticizer and any wet ingredients.

The most preferred ceramic materials for use in this invention are the pre-reacted cordierite and mullite, including mullite with a microcracking agent. The ceramic material should be in particulate form, preferably of a size finer than 200 mesh (U.S. Standard) and most preferably finer than 325 mesh (U.S. Standard). With such characteristics, the ceramic material can normally be sintered as temperatures below those at which the surface area of the incorporated porous oxides or sulfides would be adversely affected.

The monoliths are prepared by combining the components to form a homogeneous or substantially homogeneous mixture. Conventional mixing equipment can be used, but the use of a mix muller is preferred. To effect further mixing, the batch can subsequently be extruded through a "noodling" die one or more times. The noodling die can form, for example, ribbons-like or tubular shapes, or shapes having circular or polygonal cross-section. Ultimately, the batch is formed into the desired shape of the monolithic support, preferably by extrusion through a die, but another method, for example, is injection molding. The method of this invention is particularly well suited to the preparation of supports in the shape of, for example, thin-walled honeycombs and wagon-wheels.

Finally, the shapes are heated to a temperature and for a time sufficient to sinter the ceramic material. Optionally, this heating/sintering step can be preceeded by drying the shapes at about 100°–120 ° C. The heating/sintering generally takes place at 700°–1300° C., although when silicone resin is used as a binder for the ceramic matrix, particularly when the ceramic has a high alumina content, temperatures as low as 500° C. may be sufficient. Temperatures below about 1100° C. are preferred. When the high surface area support material is a zeolite, temperatures below 800° C. are preferred. With the reaction of high surface area by the embedded material, despite the temperatures used to sinter the ceramic, the monolithic support preferably has an overall surface area of at least 5–10 square meters per gram, more preferably at least 20 $m^2/g$, and most preferably at least 40 $m^2/g$. Although some sintering of the embedded material may take place, it is expected that the crystalline size of this material will grow no larger than about 0.5 microns. Crystalline size can be determined by scanning or transmission electron microscopy.

The monolithic supports of this invention may have some catalytic activity of their own by virtue of the chemistry and structure of the high surface area phase. The support may further carry additional catalytically active ingredients dispersed throughout, but generally more concentrated at the high surface area sites provided by the embedded oxide and sulfide materials. These additional catalytic ingredients can be incorporated into the monolith by methods by methods known in the art. Preferably, these ingredients will be dposited onto the high surface phase after fabricating and sintering the final structure.

The monolithic supports of this invention are useful in most applications in which it is necessary to catalytically convert undesirable components in a gas stream prior to the stream's further processing or exhaustion to the atmosphere. The supports have good thermal shock resistance, particularly when the ceramic matrix phase is microcracked, and are therefore useful in applications in which they might be exposed to rapid and frequent changes in temperature. Capability to withstand thermal shock makes the supports of this invention particularly well suited for catalyzing the conversion of truck or automotive exhaust gasses to less noxious forms.

The following examples are illustrative, but not limiting, of the invention.

EXAMPLE 1

A mixture of 91 weight % Kaiser SA alumina and 9 weight % cerium nitrate was prepared by intensively dry-mixing the ingredients. The mixture was calcined at 900° C. for six hours, after which time the surface area of the resultant powder was determined to be 120 $m^2/g$. A paste of this powder was prepared by mixing 500 grams of the powder with 750 ml of distiled water, 30 grams of zinc oxide, 30 grams of nickel oxide green, and 60 cc glacial acetic acid. An extrusion batch was prepared by charging 20 parts by weight of the paste, 80 parts of pre-reacted cordierite (milled to a particle size finer than 200 mesh), 37 parts of distilled water, 0.5 part sodium stearate, and 6.0 parts of methyl cellulose to a mix muller. The batch was mixed until substantial homogeneity and plasticity were attained. The batch was extruded through a die to form homeycomb monoliths of one-inch diameter having 200 square openings per square inch. The honeycombs were heated at various temperatures between 1000° C. and 1300° C. for six hours. Strength of the supports was not quantitatively determined, but the supports were characterized as weak, although they were capable of handling. Properties of the supports are listed below according to heating temperature.

| Heating Temp (°C.) | Porosity (%) | Mean Pore Size (Microns) | Linear Shrinkage (%) | BET Surface Area ($m^2/g$) |
|---|---|---|---|---|
| 1000 | 41 | 0.4 | 0.0 | 24 |
| 1100 | 40 | 0.45 | 0.9 | 15 |
| 1200 | 42 | 1.4 | 2.9 | 1 |
| 1300 | 41 | 1.6 | 3.9 | — |

Honeycomb catalysts fired at 1100° C. were loaded with the appropriate noble metals to test the conversions of each of HC, CO and various nitrogen oxides ($NO_x$) in gas streams. The temperature at which a 50% conversion rate for each contaminant was reached is recorded below.

| Noble Metal Loading ($gms/Ft^3$) | 50% Conversion Temperature (°C.) | | |
|---|---|---|---|
| | HC | CO | NOx |
| 19 | 330 | 330 | 330 |
| 29 | 340 | 320 | 315 |
| 37 | 350 | 325 | 325 |
| 47 | 330 | 305 | 305 |

EXAMPLE 2

A combination of 83.8 weight parts of Kaiser SA alumina, 8.44 parts cerium nitrate, 3.9 parts zinc oxide, 3.9 parts nickel oxide green, and 100 parts distilled water was mixed until a plasticized batch (the "alumina/cerium nitrate batch") was attained. The batch was calcined at 500° C. for six hours to develop high surface area. An extrusion batch was prepared by charging 20 parts by weight of the calcined alumina/cerium nitrate batch, 80 parts by weight of pre-reacted cordierite (milled to a particle size finer than 200 mesh), 43.5 parts of distilled water, 0.5 part sodium sterate, and 6.0 parts of methyl celluloe to a mix muller. The batch was mixed until substantial homogeneity and plasticity were attained. The batch was then extruded through a die to form honeycomb monoliths of one-inch diameter having 400 square openings per square inch. The honeycombs were heated at various temperatures between 1000° C. and 1300° C. for six hours. Strength of the supports was not quantitatively determined, but the supports were characterized as weak, although they were capable of handling. Properties of the supports are listed below according to heating temperature.

| Heating Temp (°C.) | Porosity (%) | Mean Pore Size Microns | Linear Shrinkage (%) | BET Surface Area ($m^2/g$) | Thermal Expansion Coefficient RT-1000° C. (cm/cm °C. × $10^7$) |
|---|---|---|---|---|---|
| 1000 | 43 | 0.4 | 0.0 | 26 | — |
| 1100 | 43 | 0.9 | 1.4 | 14 | 26 |
| 1200 | 43 | 1.7 | 4.4 | 1 | 23 |
| 1300 | 36.5 | 1.9 | 6.4 | — | 27 |

Honeycomb catalysts fired at 1100° C. were loaded with the appropriate noble metals to test the conversions of each of HC, Co, and varius nitrogen oxides ($NO_x$) in gas streams. The temperature at which a 50% conversion rate for each contaminant was reached is recorded below.

| Noble Metal Loading ($gms/Ft^3$) | 50% Conversion Temperature (°C.) | | |
|---|---|---|---|
| | HC | CO | NOx |
| 9 | 365 | 345 | 345 |
| 18 | 345 | 330 | 330 |
| 27 | 345 | 325 | 325 |
| 36 | 325 | 305 | 305 |
| 44 | 330 | 310 | 310 |

EXAMPLE 3

Example 3A Ingredients: 20 parts by weight of the calcined alumina/cerium mitrate batch of Example 2; 80 parts of raw cordierite batch, containing $B_2O3$.

Example 3B Ingredients: 20 parts by weight of the uncalcined alumina/cerium nitrate batch of Example 2; 80 parts of raw cordierite batch, containing $B_2O3$.

The compositions of Examples 3A and 3B were each mixed, separately, according to the precedure of Example 2, with 6 parts by weight of methyl cellulose, 0.5 part sodium stearate, and sufficient distilled water to obtain plasticity. The batches were extruded as honeycombs and fired as in Example 2. X-ray diffraction indicated that cordierite was not fully formed until a firing temperature of 1140° C. was reached in both examples. Surface area of the honeycombs was 8 $m^2/g$ at a firing temperature of 1100° C. and 0.7 $m^2/g$ at a temperature of 1140° C. It is thought that the high surface area alumina phase was sintered by virtue of the intimate mixing with the cordierite phase and the $B_2O_3$, which is a sintering aid.

EXAMPLE 4

The following compositions were prepared for the fabrication of honeycomb monolithic supports. Figures represent parts by weight (dry, fired weights for the inorganic ingredients).

| Ingredient | Ex. 4A | Ex. 4B | Ex. 4C |
|---|---|---|---|
| Pre-reacted cordierite (325 mesh) | 80.0 | 80.0 | 80.0 |
| Kaiser SA Medium $Al_2O_3$ | 20.0 | 17.1 | 17.0 |
| Methyl Cellulose | 4.0 | 5.0 | 5.0 |
| Sodium Stearate | 0.5 | 0.5 | 0.5 |
| $CeO_2$ (Reagent Grade) | — | 1.3 | — |
| $ZrO_2$ | — | 1.3 | — |
| $Cr_2O_3$ (Reagent Grade) | — | — | 1.0 |
| Bastnesite (Molycorp #4010) | — | — | 2.0 |

In Example 4A, the ingredients were dry mixed overnight in a roll mixer. In Examples 4B and 4C, all ingredients but the methyl cellulose and sodium stearate were wet milled overnight in trichloroethylene, after which they were dried and dry-blended with the remaining two ingredients. The subsequent procedure for all examples was as follows: The ingredients were placed into a mix muller and mulled with sufficient distilled water until a well-plasticized batch was obtained. The batches were then separately extruded through a spaghetti die at least twice to effect further mixing and, finally, extruded through a honeycomb die to form a shape having 400 square cells per square inch with a wall thickness of 6 mils. The honeycombs were steam dried and then fired in electrically heated furnaces, in air, at 50°-100° C./hr. to a maximum temperature of 800°-1200° C. with a six hour hold at the maximum temperature. Generally, there was a short hold at 300° C. to burn out the binder. Properties of the honeycomb, according to maximum firing temperature, are shown below in the table.

| Example | Heating Temp (°C.) | Density (g/cc) | Open Porosity (%) | Mean Pore Size (Microns) | BET Surface Area ($m^2g$) | Thermal Expansion Coefficient (in./in. °C. × $10^7$) | Hardness |
|---|---|---|---|---|---|---|---|
| 4A | 800 | 1.41 | 31.3 | 0.25 | 50.9 | — | Soft |
| | 1000 | 1.29 | 35.1 | 0.3 | 28.9 | 25.3 | Soft |
| | 1100 | 1.32 | 38.3 | 0.35 | 24.7 | — | Soft |
| | 1200 | 1.31 | 39.3 | 0.5 | 11.9 | — | Soft |
| 4B | 800 | 1.41 | 31.6 | 0.3 | 45.2 | — | Soft |
| | 1000 | 1.39 | 36.4 | 0.35 | 24.3 | 23.3 | Medium Hard |
| | 1100 | 1.44 | 38.3 | 0.35 | 24.4 | — | Medium Hard |
| | 1200 | 1.46 | 41.3 | 0.9 | 8.6 | — | Hard |
| 4C | 800 | 1.36 | 33.9 | 0.3 | 44.2 | — | Soft |
| | 1000 | 1.40 | 40.6 | 0.35 | 26.65 | 26.2 | Soft |
| | 1100 | 1.37 | 41.8 | 0.4 | 23.0 | — | Medium Hard |
| | 1200 | 1.42 | 43.8 | 0.9 | 11.2 | — | Medium Hard |

EXAMPLE 5

A mixture of the following ingredients was prepared: 80 parts by weight of pre-reacted cordierite (particle size finer than 200 mesh), 20 parts by weight of CABOSIL fumed silica, 6 parts by weight methyl cellulose, 0.6 part sodium stearate. Teh mixture was dry blended by rolling overnight, after which it was charged to a mix muller and mulled with sufficient distilled water to 60 produce a well-plasticized batch. The batch was extruded through a spaghetti die two times and then through a honeycomb die to form a shape having 200 square cells per square inch with a wall thickness of 15 mils. The honeycombs were steam dried and then fired as in Example 4. Properties of the honeycombs, according to firing temperature, are shown in the table below.

| Heating Temp (°C.) | Linear Shrinkage (%) | Density (g/cc) | Open Porosity (%) | Mean Pore Size (Microns) | BET Surface Area ($m^2/g$) |
|---|---|---|---|---|---|
| 700 | 0 | 1.06 | 52.1 | 0.1 | 41.9 |
| 900 | 0 | 1.06 | 51.6 | 0.2 | 33.8 |
| 1030 | 5 | 1.22 | 46.3 | 2.0 | 4.7 |
| 1100 | 7 | 1.23 | 43.5 | 2.5 | 0.7 |
| 1300 | 5 | 1.28 | 44.3 | 3.0 | 0.3 |
| 1400 | 5 | 1.41 | 36.4 | 3.8 | 0.3 |

All samples fired at temperatures of 1000° C. and above exhibited significant strength and could be easily handled without breaking.

We claim:

1. A method of preparing a monolithic catalyst support which comprises:

(a) providing a substantially homogeneous body comprising an admixture of (i) a first phase sinterable ceramic matrix material, in particulate form finer than 200 mesh, selected from the group consisting of cordierite, mullite, alpha-alumina, lithium aluminosilicate, and mixtures of these, and (ii) a second phase high surface area catalyst-support material having a crystalline size no larger than 0.2 microns and a surface area of at least 40 $m^2/g$, said catalys-support material consisting of transition metal sulfide; a mixture of transition metal sulfides; porous oxide selected from the group consisting of [alumina,] zirconia, spinel, silica, zeolite, titania, [and] mixtures of these, *and mixtures of the preceeding with alumina;* or a mixture of said sulfide and said oxide materials;

(b) forming the resultant body into a desired shape; and (c) heating the shaped body at a temperature sufficient to sinter the first phase matrix material.

2. A method of claim 1 in which mixing step (a) is performed using 50–90 parts by weight of the first phase material and 10–50 parts by weight of the second phase material.

3. A method of claim 2 in which mixing step (a) is performed using 1–30 part by weight of a binder material.

4. A method of claim 3 in which the second phase material has a surface area of at least 100 $m^2/g$ and is selected from the group consisting of [alumina,] silica, zeolite, [and] mixtures of these, *and mixtures of the preceeding with alumina.*

5. A method of claim 4 in which [the second phase material is alumina, and] the binder is methyl cellulose, a silicone resin, or mixtures of these.

6. A method of claim 4 in which the second phase material is silica and the binder is methyl cellulose, a silicone resin, or mixture of these.

7. A method of claim 4 in which the second phase material is a mixture of silica and alumina and the binder is methyl cellulose, a silicone resin, or mixtures of these.

8. A method of claim 4 in which the second phase material is a zeolite and the binder is methyl cellulose, a silicone resin, or mixture of these.

9. A method of claim 3 in which the second phase material is titania and the binder is methyl cellulose, a silicone resin, or mixtures of these.

10. A method of claim 3 in which the second phase material is a spinel and the binder is methyl cellulose, a silicone resin, or mixtures of these.

11. A method of claim 3 in which the second phase material is zirconia or a transition metal sulfide.

12. A method of claim 5, 6, 7, 8, 9, or 10 in which the first phase sinterable material is cordierite or mullite.

13. A method of claim 5, 6, 7, 8, 9, or 10 in which the first phase sinterable material is alpha-alumina.

14. A monolithic catalyst support prepared by the method of claim 1.

15. A monolithic catalyst support prepared by the method of claim 12.

16. A monolithic catalyst support prepared by the method of claim 13.

17. A monlithic catalyst support comprising 50–90 parts by weight of a sintered ceramic matrix material and 10–50 parts per weight of a high surface area catalyst-support material dispersed throughout the matrix wherein (a) the ceramic matrix material consists of cordierite, mullite, alpha-alumina, lithium aluminosilicate, or mixtures of these; and (b) the dispersed catalyst-support material has a surface area of at least 40 $m^2/g$ and a crystallite size no larger than about 0.5 microns, and the catalyst-support material consists of transition metal sulfide; a mixture of transition metal sulfides; porous oxide selected from the group consisting of [alumina,] zirconia, spinel, silica, zeolite, titania, [and] mixtures of these, *and mixtures of the preceeding with alumina*; or a mixture of said sulfide and said oxide materials.

18. A monolithic catalyst support of claim 17 wherein the dispersed catalyst-support material has a surface area of at least 100 $m^2/g$ and is [alumina,] silica, zeolite, [or] mixture of these[.] *, or mixtures of the preceeding with alumina.*

[19. A monolithic catalyst support of claim 18 wherein the dispersed catalyst-support material is a transition alumina.]

20. A monolthic catalyst suppport of claim 18 wherein the dispersed catalyst-support material is silica.

21. A monolithic catalyst support of claim 17 wherein the dispersed catalyst-support material is a spinel.

22. A monlithic catalyst support of claim 17, 18, [19,] 20, or 21 in which the ceramic matrix material is cordierite or mullite.

23. A monolithic catalyst support of claim 22 having a surface area of at least 5 $m^2/g$.

24. A method of claim 1 in which the second phase material is [alumina,] spinel, or a mixture of alumina and silica; and in which the admixture further comprises up to 20 percent by weight, based on the weight of the second phase material, or rare earth oxide.

25. A monolithic catalyst support of claim 17 wherein the dispersed catalyst-support material is [alumina,] spinel, or a mixture of alumina and silica; and wherein the monolithic catalyst support further comprises up to 20 percent by weight, based on the weight of the dispersed catalyst-support material, of rare earth oxide.

* * * * *